(12) United States Patent
Niedzwiecki et al.

(10) Patent No.: US 10,468,644 B2
(45) Date of Patent: Nov. 5, 2019

(54) BATTERY CELL WITH INTEGRATED MOUNTING FOOT

(71) Applicants: Robert Bosch GmbH, Stuttgart (DE); Samsung SDI Co., Ltd., Yongin-si, Gyeonggi-do (KR)

(72) Inventors: Mark A. Niedzwiecki, Troy, MI (US); Jason A. Durfee, Troy, MI (US)

(73) Assignees: Samsung SDI CO., LTD, Yongin-si, Gyeonggi-Do (KR); Robert Bosch GmbH, Stuttgart (DE)

( * ) Notice: Subject to any disclaimer, the term of this patent is extended or adjusted under 35 U.S.C. 154(b) by 1920 days.

(21) Appl. No.: 13/653,768

(22) Filed: Oct. 17, 2012

(65) Prior Publication Data

US 2013/0095360 A1  Apr. 18, 2013

Related U.S. Application Data

(60) Provisional application No. 61/547,959, filed on Oct. 17, 2011.

(51) Int. Cl.
| | | |
|---|---|---|
| *H01M 2/10* | (2006.01) | |
| *H01M 10/04* | (2006.01) | |
| *H01M 10/052* | (2010.01) | |
| *H01M 10/0525* | (2010.01) | |
| *H01M 10/0585* | (2010.01) | |

(52) U.S. Cl.
CPC ....... *H01M 2/1083* (2013.01); *H01M 2/1077* (2013.01); *H01M 10/0413* (2013.01); *H01M 10/052* (2013.01); *H01M 10/0525* (2013.01); *H01M 10/0585* (2013.01)

(58) Field of Classification Search
CPC ... H01M 2/10; H01M 2/1077; H01M 10/0413
See application file for complete search history.

(56) References Cited

U.S. PATENT DOCUMENTS

| | | | |
|---|---|---|---|
| 2,933,548 A | | 4/1960 | Walker |
| 3,988,170 A | * | 10/1976 | Koch .................. H01M 2/0245 220/23.4 |
| 6,230,834 B1 | * | 5/2001 | Van Hout ............... B60R 16/04 180/68.5 |

(Continued)

FOREIGN PATENT DOCUMENTS

| | | |
|---|---|---|
| FR | 1 368 075 | 6/1964 |
| FR | 2 662 121 | 11/1991 |

OTHER PUBLICATIONS

Science Dictionary, Definition of "Snap-Fit", See p. 1.*

(Continued)

*Primary Examiner* — Sarah A. Slifka
*Assistant Examiner* — Brian R Ohara
(74) *Attorney, Agent, or Firm* — Maginot Moore & Beck LLP

(57) ABSTRACT

A battery cell according to the principles of the present disclosure includes a cell housing and a mounting member that is fixed to an outer surface of the cell housing. In one example, the mounting member is formed separate from the cell housing and attached to the outer surface of the cell housing. In another example, the mounting member is unitarily formed with the cell housing and protrudes from a planar surface of the cell housing.

5 Claims, 4 Drawing Sheets

(56) References Cited

U.S. PATENT DOCUMENTS

| | | | |
|---|---|---|---|
| 6,372,377 B1* | 4/2002 | Ovshinsky | H01M 10/02 |
| | | | 429/66 |
| 6,444,352 B1* | 9/2002 | Herrmann et al. | 429/96 |
| 7,291,421 B2 | 11/2007 | Kimura et al. | |
| 7,858,224 B2 | 12/2010 | Kim et al. | |
| 7,935,438 B2 | 5/2011 | Kim | |
| 2001/0030069 A1* | 10/2001 | Misu | B60K 1/04 |
| | | | 180/68.1 |
| 2003/0017387 A1 | 1/2003 | Marukawa et al. | |
| 2007/0087266 A1* | 4/2007 | Bourke et al. | 429/159 |
| 2008/0318119 A1* | 12/2008 | Watanabe et al. | 429/99 |
| 2008/0318120 A1* | 12/2008 | Nakamura | H01M 2/1072 |
| | | | 429/99 |
| 2009/0053591 A1 | 2/2009 | Ikeda et al. | |
| 2009/0239137 A1 | 9/2009 | Kakuchi et al. | |
| 2009/0246616 A1 | 10/2009 | Koyama et al. | |
| 2010/0081048 A1 | 4/2010 | Nansaka et al. | |
| 2010/0151312 A1 | 6/2010 | Kim et al. | |
| 2010/0227212 A1 | 9/2010 | Kim | |
| 2010/0248005 A1 | 9/2010 | Byun | |
| 2011/0081569 A1 | 4/2011 | Kim et al. | |
| 2011/0159353 A1 | 6/2011 | Byun et al. | |
| 2011/0165451 A1 | 7/2011 | Kim et al. | |
| 2011/0177382 A1 | 7/2011 | Kim | |
| 2011/0195296 A1 | 8/2011 | Kim et al. | |

OTHER PUBLICATIONS

BCI group numbers (URLhttp://www.batteryweb.com/bci.cfm) (Year: 2018).*

Science Dictionary, Definition of "Snap-Fit", see p. 1 (Year: 2016).*

International Search Report and Written Opinion of ISA for PCT/US2012/060576 dated Oct. 17, 2012; ISA/EPO.

* cited by examiner

BATTERY CELL WITH INTEGRATED MOUNTING FOOT

CROSS-REFERENCE TO RELATED APPLICATIONS

This application claims the benefit of U.S. Provisional Application No. 61/547,959, filed on Oct. 17, 2011. The disclosure of the above application is incorporated herein by reference in its entirety.

FIELD

The present disclosure relates to battery cells for a vehicle, and more specifically to battery cells with an integrated mounting foot.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric vehicles (EVs), hybrid electric vehicles (HEVs) and plug-in HEVs use one or more propulsion systems to provide motive power. The propulsion systems include an electric system that receives power from a battery pack. A battery pack typically includes one or more battery modules that each includes a plurality of high-voltage cells (or batteries) such as lithium ion cells. The cells are electrically connected to one another and mechanically linked together to form a self-supporting assembly.

Battery packs have been developed that include hardware such as endplates, sideplates, and insulators for grouping battery cells into one or more battery modules. The endplates and sideplates are placed around a plurality of cells to band the cells together. Module hardware such as the endplates, the sideplates, and the insulators increase the size, the mass, and the material cost of the battery packs. In addition, the module hardware increases the amount of labor required to assemble the battery packs, which increases the labor cost associated with assembling the battery packs.

SUMMARY

A battery cell according to the principles of the present disclosure includes a cell housing and a mounting member that is fixed to an outer surface of the cell housing. In one example, the mounting member is formed separate from the cell housing and attached to the outer surface of the cell housing. In another example, the mounting member is unitarily formed with the cell housing and protrudes from a planar surface of the cell housing.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A battery pack according to the principles of the present disclosure includes a plurality of battery cells that each include a cell can and one or more mounting members fixed to the cell can. The mounting members can be unitarily formed with the cell can using, for example, an extrusion process, or the mounting members can be formed separate from the cell can and subsequently attached to the cell can. In one example, the mounting members are a pair of L-shaped brackets attached to opposite ends of the cell can near its base, and clamping members overlap the L-shaped brackets to secure the battery cells within the battery pack.

The mounting members allow the battery cells to be installed directly into the battery pack without banding the battery cells together into one or more battery modules using module hardware such as endplates, sideplates, or insulators. Eliminating the module hardware decreases the size, mass, and material cost of the battery pack. In addition, eliminating the module hardware decreases the amount of labor required to assemble the battery pack, which decreases the labor cost of the battery pack. Further, eliminating the module hardware provides more design flexibility to package additional battery cells within the battery pack without increasing the size of the battery pack.

Figure 1:
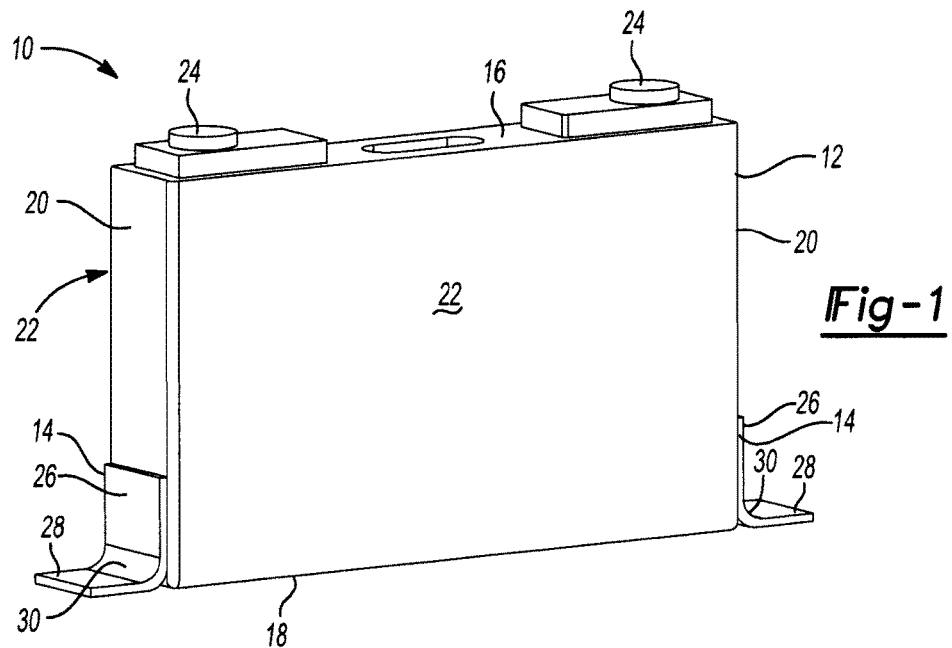
FIG. 1 is a perspective view of a first example of a battery cell according to the principles of the present disclosure, the battery cell including mounting members.

Referring now to FIG. 1, a battery cell 10 includes a cell can or housing 12 and mounting members 14. The mounting members 14 can be formed separate from the cell can 12 and attached to the cell can 12, as shown, or the mounting members 14 can be unitarily formed with the cell can 12. The cell can 12 and/or the mounting members 14 can be made from metal (e.g., aluminum) using extrusion or hydroforming. Additionally, the cell can 12 and/or the mounting members 14 can be made from plastic using, for example, injection molding. The mounting members 14 can be attached to the cell can 12 using a weld, adhesive, and/or mating features.

The cell can 12 forms a rectangular cuboid having six planar faces or surfaces including a top surface 16, a bottom surface 18, end surfaces 20, and side surfaces 22. Cell terminals 24 can be disposed on the top surface 16 of the cell can 12 for connecting the battery cell 10 to other battery cells within a battery pack. The labels used for the different surfaces of the cell can 12, including "top," "bottom, "side," and "end," apply to the orientation shown and may change if the battery cell 10 is in a different orientation.

In the example shown, the mounting members 14 include a pair of L-shaped brackets attached to the end surfaces 20 of the cell can 12 near the bottom surface 18 of the cell can 12. In various implementations, the mounting members 14 can be attached to other surfaces of the cell can 12 such as the side surfaces 22 and/or attached at other locations such as near the top surface 16 of the cell can 12. Each of the mounting members 14 includes a first portion 26, a second portion 28, and a third portion 30. The first portion 26 engages one of the end surfaces 20. The second portion 28 is configured to engage a structural member of a battery pack such as a base tray or a cooling plate. The third portion 30 extends between the first portion 26 and the second portion 28 and can be rounded as shown.

Figure 2:
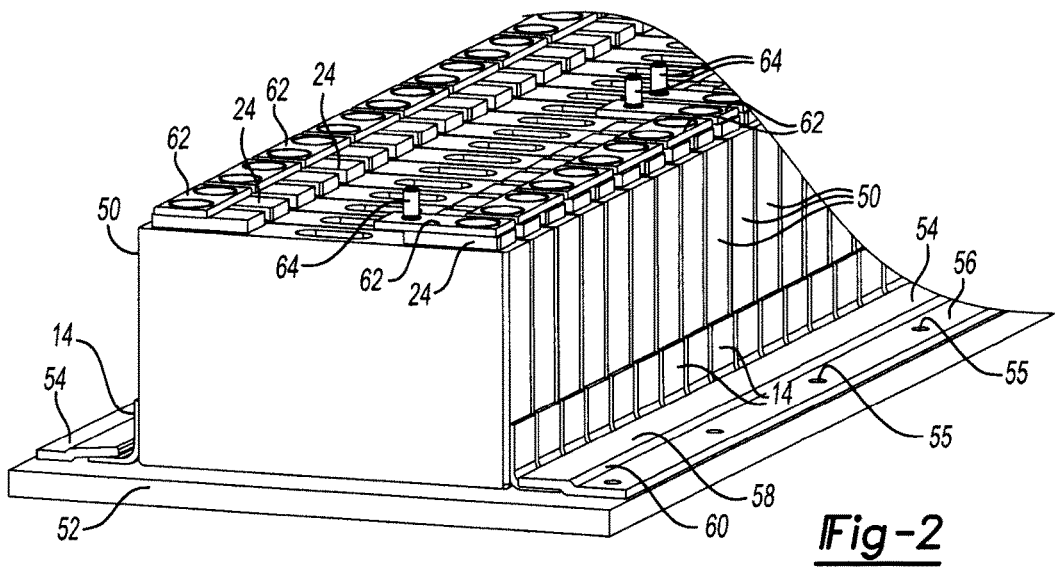
FIG. 2 is a perspective view of a plurality of battery cells similar to the battery cell of FIG. 1 and clamping members that overlap the mounting members to secure the battery cells to a structural member such as a base tray or a cooling plate.
Figure 3:
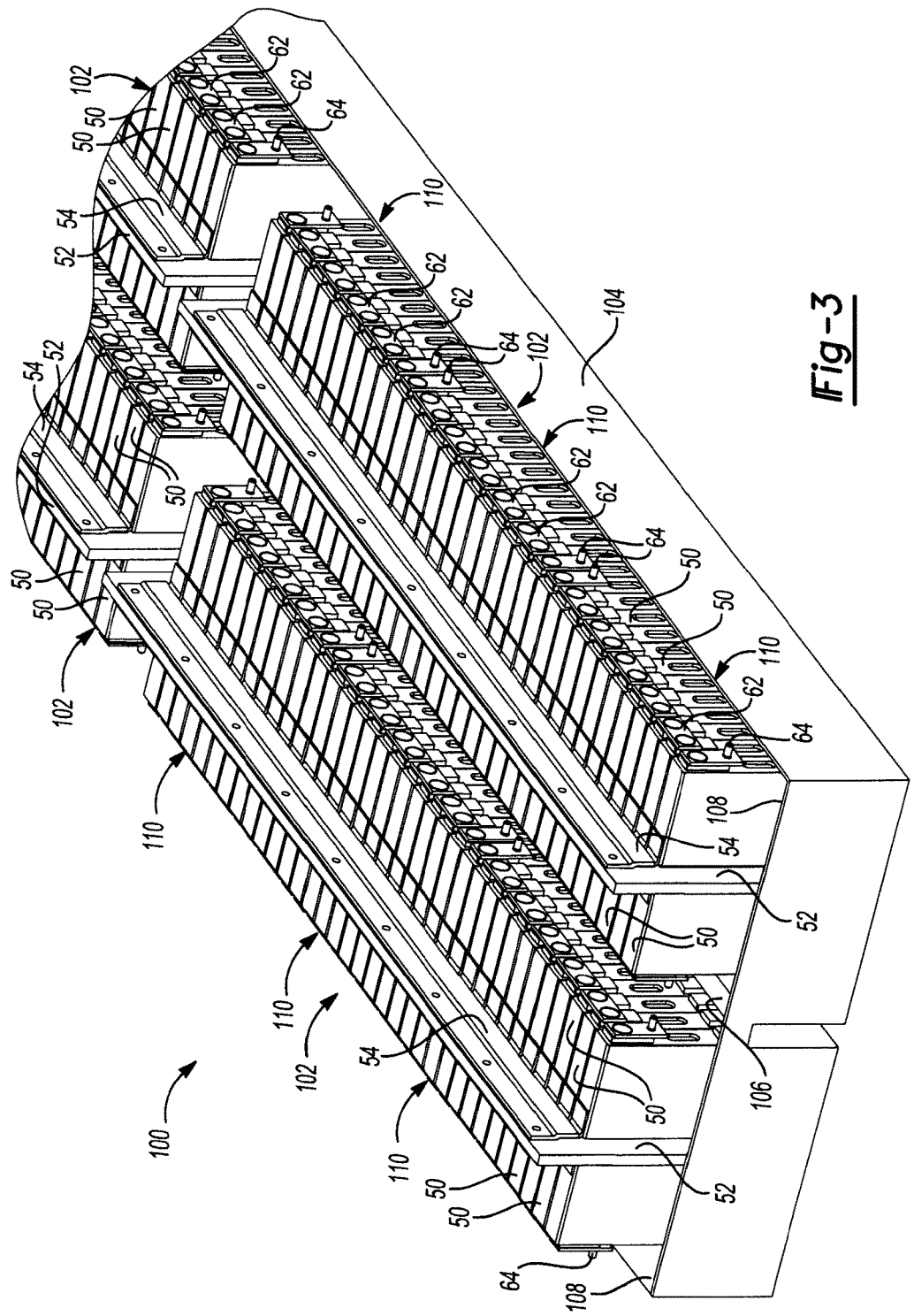
FIG. 3 is a perspective view of a portion of an example battery pack according to the principles of the present disclosure, the battery pack including a plurality of battery cells and clamping members securing the battery cells as shown in FIG. 2.

Referring now to FIG. 2, a plurality of battery cells 50 similar to the battery cell 10 of FIG. 1 are shown aligned in a row and secured to a structural member 52 of a battery pack, such as a base tray or a cooling plate, using clamping members 54. In one example, the battery cells 50 are oriented upright with the cell terminals 24 facing up, as shown in FIG. 2, when the battery cells 50 are installed in a battery pack. In another example, the battery cells 50 are oriented on their sides with the cell terminals 24 facing out in a horizontal direction, as shown in FIG. 3.

Referring still to FIG. 2, the clamping members 54 overlap the mounting members 14 on the battery cells 50 to secure the battery cells 50 to the structural member 52. In the example shown, the clamping members 54 are bars configured to extend along the length of a battery pack. The length of the clamping members 54 may depend on the number of the battery cells 50 to be secured. The clamping members 54 define holes 55 for fastening the clamping members 54 to the structural member 52.

During assembly, the battery cells 50 are placed on the structural member 52 and aligned in a row as shown. The clamping members 54 are then placed on the structural members 52 to overlap the mounting members 14 on the battery cells 50 as shown. Fasteners are then inserted into the holes 55 to secure the battery cells 50 to the structural member 52. In various implementations, the mounting members 14 define holes for receiving fasteners to fasten the battery cells 50 directly to the structural member 52. In these implementations, the clamping members 54 may be omitted. Other methods of mounting the battery cells 50 directly to the mounting members 14 include using a snap-fit mechanism and/or a quick-release mechanism.

Each of the clamping members 54 includes a first portion 56, a second portion 58, and a third portion 60. The first portion 56 engages the structural member 52. The second portion 58 engages the second portion 28 of the mounting members 14. The third portion 60 extends between the first portion 56 and the second portion 58. The third portion 60 can include a bend to provide a gap between the second portion 58 and the structural member 52 when the first portion 56 engages the structural member 52. The size of the gap may be equal to the thickness of the second portion 28.

In the example shown, bus bars 62 connect the cell terminals 24 on the battery cells 50 in series. In another example, the battery cells 50 are connected in parallel. Whether connected in series or parallel, the battery cells 50 can be electrically connected in groups to form a battery module without banding the battery cells 50 together using module hardware such as endplates and sideplates. Module terminals 64 are attached to two of the bus bars 62 for connecting the battery module to other battery modules within a battery pack and/or to an electrical system in a vehicle.

A battery pack may include one or more battery modules that are electrically connected but not banded together. Since specific module hardware is not required, the number of the battery cells 50 included in each battery module in a battery pack may be non-uniform. Thus, eliminating module hardware may provide more design flexibility to package additional battery cells within a battery pack without increasing the overall size of the battery pack.

Referring now to FIG. 3, a battery pack 100 includes a plurality of battery modules 102 disposed within a base tray 104. Each of the battery modules 102 includes a plurality of the battery cells 50 secured to both sides of the structural member 52 using the clamping members 54. In the example shown, the base tray 104 includes a dividing wall 106 that divides the base tray 104 into compartments 108. The width of the compartments 108 is slightly greater than the width of the battery modules 102.

During assembly, the battery modules 102 may be constructed first, and then the battery modules 102 may be placed in and secured to the base tray 104. The battery modules 102 may be secured to base tray 104 using brackets (not shown) that are fastened to the structural member 52 and the base tray 104. A cover (not shown) may then be placed over the base tray 104 to cover the battery modules 102.

Each of the battery modules 102 includes a number (e.g., 6) of sub-modules 110. Each of the sub-modules 110 include a number (e.g., 12) of the battery cells 50 electrically connected to one another using the bus bars 62 but not banded together using module hardware such as endplates and sideplates. Each of the sub-modules 110 includes a pair of the module terminals 64 for connecting the sub-modules 110 to other sub-modules 110 within the battery pack 100 and/or to a vehicle electrical system.

Figure 4:
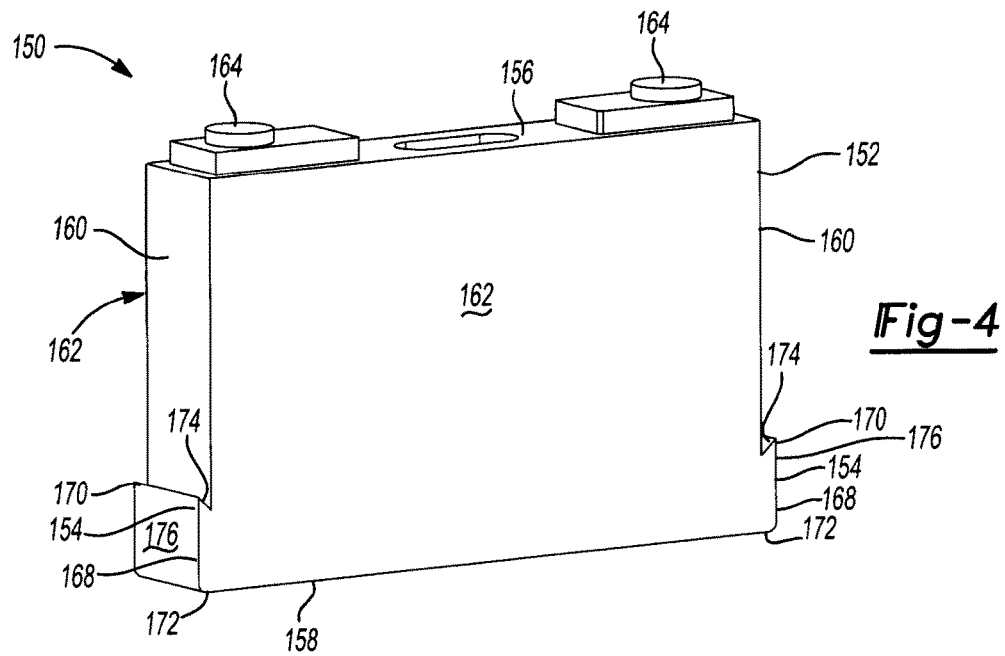
FIG. 4 is a perspective view of a second example of a battery cell according to the principles of the present disclosure, the battery cell including mounting members.

Referring now to FIG. 4, a battery cell 150 includes a cell can or housing 152 and mounting members 154. The mounting members 154 are unitarily formed with the cell can 12. The cell can 152 and/or the mounting members 154 can be made from metal (e.g., aluminum) using extrusion or hydroforming. Additionally, the cell can 152 and/or the mounting members 154 can be made from plastic using, for example, injection molding.

The cell can 152 forms a rectangular cuboid having six planar faces or surfaces including a top surface 156, a bottom surface 158, end surfaces 160, and side surfaces 162. Cell terminals 164 can be disposed on the top surface 156 of the cell can 152 for connecting the battery cell 150 to other battery cells within a battery pack. The labels used for the different surfaces of the cell can 152, including "top," "bottom, "side," and "end," apply to the orientation shown and may change if the battery cell 150 is in a different orientation.

In the example shown, the mounting members 154 include a pair of protrusions positioned near the bottom surface 158 of the cell can 152 and protruding outward from the end surfaces 160 of the cell can 152. Each of the mounting members 154 includes a first portion 168 and a second portion 170. The first portion 168 may form a square or rectangular cuboid having a bottom surface 172 that is configured to engage a structural member of a battery pack such as a base tray or a cooling plate. The second portion 170 may form a triangular wedge having a top surface 174 that is configured to engage a snap-fit mechanism to secure the battery cell 150 within a battery pack. An end surface 176 of each of the mounting members 154 may also engage a snap-fit mechanism to secure the battery cell 150 within a battery pack.

Figure 5:
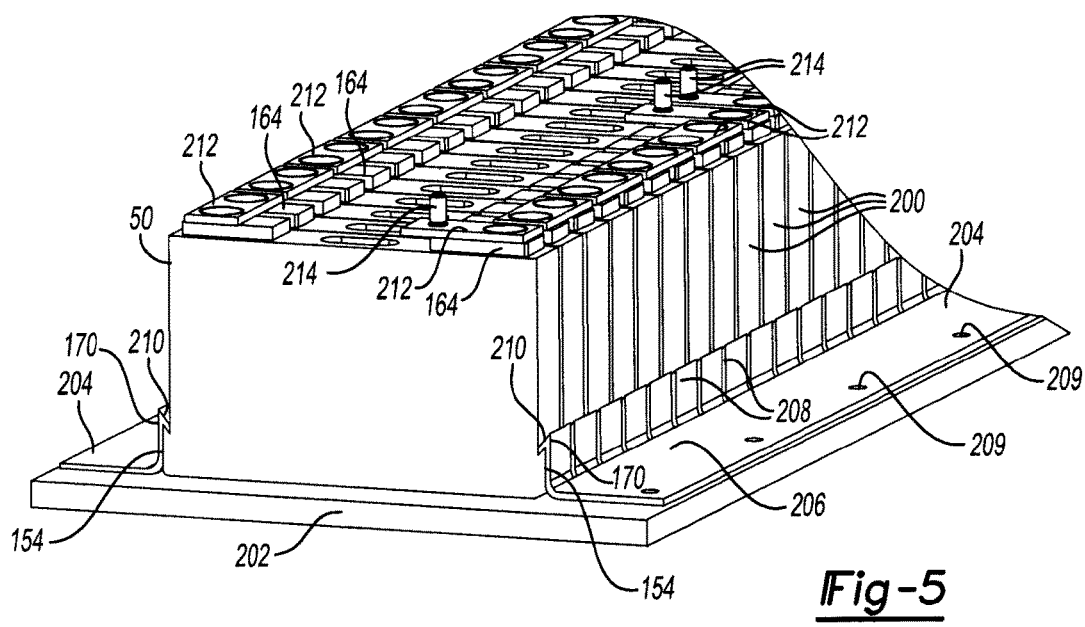
FIG. 5 is a perspective view of a plurality of battery cells similar to the battery cell of FIG. 4 and snap fit mechanisms that engage the mounting members to secure the battery cells to a structural member such as a base tray or a cooling plate.

Referring now to FIG. 5, a plurality of battery cells 200 similar to the battery cell 150 of FIG. 4 are shown aligned in a row and secured to a structural member 202 of a battery pack, such as a base tray or a cooling plate, using snap-fit mechanisms 204. In one example, the battery cells 200 are oriented upright with the cell terminals 164 facing up, as shown in FIG. 5, when the battery cells 200 are installed in a battery pack. In another example, the battery cells 200 are oriented on their sides with the cell terminals 164 facing out in a horizontal direction.

Each of the snap-fit mechanisms 204 includes a base member 206 and a plurality of flexible members 208. The base member 206 and the flexible members 208 can be unitarily formed, as shown, or the base member 206 and the flexible members 208 can be formed separately and joined together. In one example, the base member 206 and the flexible members 208 are unitarily formed from plastic using injection molding. In the example shown, the base members 206 define holes 209 for receiving fasteners to fix the snap-fit mechanisms 204 to the structural member 202.

The flexible members 208 engage the mounting members 154 of the battery cells 200 to yield an interference fit that secures the battery cells 200 to the structural member 202. In this regard, the flexible members 208 each include a hook portion 210 that engages the second portion 170 of the mounting members 154. The battery cells 200 can be secured to the structural member 202 using other snap-fit mechanisms, such as flexible brackets defining slots that receive protrusions on the battery cells 200. The protrusions can be shaped to correspond to fill the slots, can be sized different from the mounting members 154, and/or can be positioned at a different location relative to the mounting members 154.

The snap-fit mechanisms 204 enable quick and easy installation of the battery cells 200 into a battery pack, which reduces labor cost associated with assembling the battery pack. In addition, the snap-fit mechanisms 204 enable the battery cells 200 to be individually installed into and uninstalled from a battery pack. Thus, each of the battery cells 200 may be serviced without uninstalling other ones of the battery cells 200, which reduces labor cost associated with servicing a battery pack.

In the example shown, bus bars 212 connect the cell terminals 164 on the battery cells 200 in series. In another example, the battery cells 200 are connected in parallel. Whether connected in series or parallel, the battery cells 200 can be electrically connected in groups to form a battery module without banding the battery cells 200 together using module hardware such as endplates and sideplates. Module terminals 214 are attached to two of the bus bars 212 for connecting the battery module to other battery modules within a battery pack and/or to a vehicle electrical system.

Figure 6:
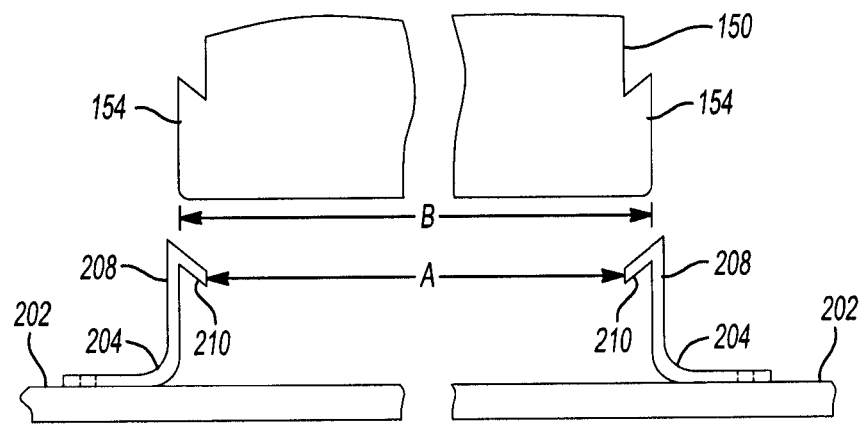
FIGS. 6 through 8 are side views that illustrate securing the battery cell of FIG. 4 to the structural member of FIG. 5 using the snap-fit mechanisms of FIG. 5.
Figure 7:
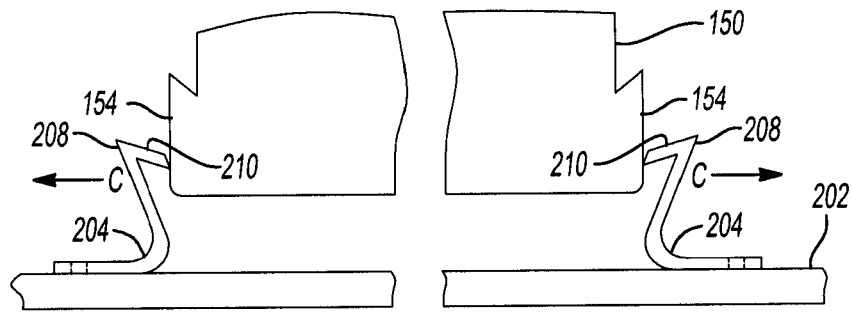
Figure 8:
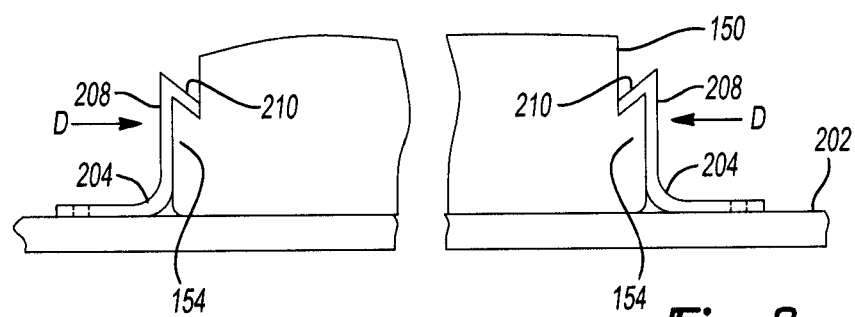

Referring now to FIGS. 6 through 8, securing the battery cell 150 to the structural member 202 using the snap-fit mechanisms 204 is illustrated. Before the battery cell 150 is installed, a distance A between the flexible members 208 is less than a width B of the battery cell 150 at its base, as shown in FIG. 6. As the battery cell 150 is installed, the mounting members 154 engage the flexible members 208, causing the flexible members 208 to deflect away from the end surfaces 160 of the battery cell 150 in directions C, as shown in FIG. 7. As the cell can 152 engages the structural member 202, the flexible members 208 deflect toward the end surfaces 160 in directions D and the hook portions 210 of the flexible members 208 engage the mounting members 154, as shown in FIG. 8.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings and the specification.

What is claimed is:

1. A battery pack comprising:
a structural member;
a plurality of battery cells, each of which comprises:
a cell housing including a top surface, a bottom surface, a first end surface, and a second end surface at an opposite longitudinal end of the cell housing from the first end surface;
a first mounting member formed separate from the cell housing and attached to the first end surface of the cell housing between the top and bottom surfaces; and
a second mounting member formed separate from the cell housing and attached to the second end surface of the cell housing between the top and bottom surfaces;
a first clamping member secured to the structural member using fasteners, the first clamping member engaging each of the first mounting members to secure the battery cells to the structural member; and
a second clamping member secured to the structural member using the fasteners, the second clamping member engaging each of the second mounting members to secure the battery cells to the structural member,
wherein the battery pack does not include plates that band, clamp, or affix the plurality of battery cells together.

2. The battery pack of claim 1 wherein each of the first and second mounting members includes an L-shaped bracket.

3. The battery pack of claim 1 wherein the first and second mounting members are welded to the first and second end surfaces, respectively, of the cell housing.

4. The battery pack of claim 1 wherein the first and second mounting members are further attached to the first and second end surfaces, respectively, of the cell housing using an adhesive.

5. The battery pack of claim 1 wherein the first and second mounting members are attached to the first and second end surfaces, respectively, of the cell housing adjacent to the bottom surface of the cell housing.

* * * * *

UNITED STATES PATENT AND TRADEMARK OFFICE
CERTIFICATE OF CORRECTION

PATENT NO.        : 10,468,644 B2
APPLICATION NO.   : 13/653768
DATED             : November 5, 2019
INVENTOR(S)       : Niedzwiecki et al.

Page 1 of 1

It is certified that error appears in the above-identified patent and that said Letters Patent is hereby corrected as shown below:

In the Claims

In Claim 1, at Column 6, Line 36: "a first clamping member secured to the structural member" should read --a first clamping member configured to be secured to the structural member--.

In Claim 1, at Column 6, Lines 37-38: "the first clamping member engaging each of the first mounting members" should read --the first clamping member engaging the first mounting member--.

In Claim 1, at Column 6, Lines 40-41: "a second clamping member secured to the structural member" should read --a second clamping member configured to be secured to the structural member--.

In Claim 1, at Column 6, Lines 41-42: "the second clamping member engaging each of the second mounting members" should read --the second clamping member engaging the second mounting member--.

In Claim 1, at Column 6, Lines 44-45: "does not include plates that band, clamp, or affix the plurality of battery cells together" should read --does not include plates that band the battery cells together--.

Signed and Sealed this
Seventeenth Day of March, 2020

Andrei Iancu
*Director of the United States Patent and Trademark Office*